(12) United States Patent
Chantal

(10) Patent No.: US 6,680,006 B2
(45) Date of Patent: Jan. 20, 2004

(54) CONVERSION OF NATURAL GAS TO SYNTHESIS GAS USING NICKEL CATALYST

(75) Inventor: Pierre D. Chantal, Ottawa (CA)

(73) Assignee: Natural Resources Canada, Ottawa (CA)

( * ) Notice: Subject to any disclaimer, the term of this patent is extended or adjusted under 35 U.S.C. 154(b) by 247 days.

(21) Appl. No.: 10/015,783

(22) Filed: Dec. 17, 2001

(65) Prior Publication Data

US 2003/0113256 A1 Jun. 19, 2003

(51) Int. Cl.⁷ .................... C10L 3/00; C01B 31/18; C01B 3/26; C01B 3/40; B01J 29/06
(52) U.S. Cl. .................... 252/373; 423/418.2; 423/650; 423/651; 502/63; 502/355
(58) Field of Search .................... 423/650, 651, 423/418.2; 502/355, 63; 252/373

(56) References Cited

U.S. PATENT DOCUMENTS

| | | | |
|---|---|---|---|
| 5,108,725 A | 4/1992 | Beck et al. | 423/263 |
| 5,112,527 A | 5/1992 | Kobylinski | 252/373 |
| 5,134,241 A | 7/1992 | Le et al. | 585/332 |
| 5,149,464 A | 9/1992 | Green et al. | 252/373 |
| 5,270,273 A | 12/1993 | Pelrine et al. | 502/60 |
| 5,399,537 A | 3/1995 | Bhattacharyya et al. | 502/84 |
| 5,431,855 A | 7/1995 | Green et al. | 252/373 |
| 6,497,812 B1 * | 12/2002 | Schinski | 208/131 |

FOREIGN PATENT DOCUMENTS

CN   1309079 A   *   8/2001   ............. C01B/3/40

* cited by examiner

Primary Examiner—Stanley S. Silverman
Assistant Examiner—Jonas N. Strickland

(57) ABSTRACT

A process is described for converting gaseous lower alkanes, e.g. methane, into synthesis gas. In the process, a mixture of the alkanes and oxygen is subjected to partial oxidation in a reaction zone in the presence of a catalyst comprising a mesoporous aluminosilicate solid catalyst having the structure of MCM-41 with a silica-to-alumina ratio of about 5:1 to 1000:1 pore diameters of at least 5 Å and a nickel loading of about 5–20% by weight. This provides a high level of conversion of the alkanes as well as a high selectivity to formation of carbon monoxide and hydrogen.

10 Claims, No Drawings

CONVERSION OF NATURAL GAS TO SYNTHESIS GAS USING NICKEL CATALYST

FIELD OF THE INVENTION

This invention relates to a process for converting gaseous lower alkanes, e.g. methane, to synthesis gas by partial oxidation.

BACKGROUND OF THE INVENTION

In view of the dwindling supplies worldwide of liquid petroleum, there is a growing interest in natural gas as an industrial feedstock. Natural gas is primarily composed of methane and there is a great interest in efficient processes for converting this methane into synthesis gas. Synthesis gas, a mixture of carbon monoxide and molecular hydrogen is a valuable industrial feedstock for the manufacture of a wide variety of useful chemicals.

A common commercial source of synthesis gas has been the steam reforming of coal or natural gas. However, it is an inefficient and very energy intensive process for this purpose.

Catalytic partial oxidation is a much more energy efficient process and a number of such industrial processes have been developed. One process is described in Kobylinski U.S. Pat. No. 5,112,527, issued May 12, 1992. This process used as partial oxidation catalyst the so-called "platinum group" metals of Group VIII of the periodic table, e.g. platinum or palladium supported on alumina. However, in that process, no more than 20% conversion from methane to synthesis gas could be carried out because of the formation of coke.

Bhattacharyya et al. U.S. Pat. No. 5,399,537, issued Mar. 21, 1995 describes a process for conversion of methane to synthesis gas by partial oxidation using a hydrotalcite-like compound, e.g. a compound of the formula $NiMg_5Al_2(OH)_{16}CO_3$.

In Green et al. U.S. Pat. No. 5,431,855, issued Jul. 11, 1995 a method is described for converting a gas mixture comprising $CO_2$, $O_2$ and $CH_4$ into a product gas mixture comprising $H_2$ and CO by a combined partial oxidation-dry reforming reaction. For this procedure there was used a solid catalyst of the formula $M_xM'_yO_z$ where M is Mg, B, Al, Ga, Si, Ti, Zr, Hf or Ln and M' is Fe, Os, Co, Rl, Ir, Pd, Pt, Ni or Ru.

Green et al. U.S. Pat. No. 5,149,464, issued Sep. 22, 1992 describes a process for partial oxidation of methane to synthesis gas again using a solid catalyst of the formula $M_xM'_yO_z$ where M is Mg, B, Al, Ga, Si, Ti, Zr, Hf or Ln and M' is Fe, Os, Co, Rl, Ir, Pd, Pt, Ni or Ru.

There has been a very strong recent interest in mesoporous zeolites as catalyst for a variety of chemical processes. A mesoporous catalyst of particular interest is the MCM-41 family. These catalysts are described in a number of patents including U.S. Pat. Nos. 5,198,684 and 5,270,273, incorporated herein by reference. The MCM-41 mesoporous catalysts are typically alumina silicates with pore diameters in the range of about 20–100 Å. These catalysts have been found to be particularly useful for the oligomerization of olefins.

It is an object of the present invention to provide an improved process for the catalytic partial oxidation of methane to synthesis gas that maintains a high methane conversion with minimal carbon deposition.

SUMMARY OF THE INVENTION

The present invention in its broadest aspect relates to the catalytic partial oxidation of lower ($C_1$–$C_4$) alkanes to synthesis gas in which there is used as partial oxidation catalyst a mesoporous alumino silicate solid catalyst having the structure of MCM-41 and further having a nickel loading of about 5–20% by weight. The MCM-41 catalyst used in the present invention typically has a silica-alumina ratio of at least about 5:1 typically 5:1-1000-1, and pore diameters of about 15–100 Å.

The nickel, in the form of NiO, may conveniently be deposited on the MCM-41 catalyst by an incipient wetness technique. The resulting catalyst is calcined in order to obtain the oxide form of the nickel. The calcined form of the catalyst is then loaded into the reactor and reduced in-situ.

Using the above catalyst, a high reactivity towards the conversion of methane is maintained as well as a high selectivity to carbon monoxide and hydrogen. For instance, methane conversions to synthesis gas of over 80% have been maintained with selectivities to CO and $H_2$ of higher than 95%, while using reaction temperatures no higher than 750° C.

DESCRIPTION OF THE PREFERRED EMBODIMENTS

The MCM-41 catalyst used in accordance with this invention is typically an alumino silicate material and a common product of this type has pore diameters in the range of about 40 Å. It has been found that with MCM-41 catalyst of this type, an optimal nickel loading is in the order of about 11–15% by weight. It has also been found that coke deposits form on the catalyst only when the nickel loading is too high and/or the pore diameters are too small.

In the gaseous feedstock to the process of this invention, the atomic ratio of carbon to oxygen in the mixture of alkane and oxygen is preferably in the range of about 0.75:1.0 to 1.1:1.0. The processing temperatures may range from about 400 to 1000° C. and it is preferred to operate at temperatures less than 800° C.

The gas hourly space velocity (GHSV) can vary quite widely, e.g. from as low as about 250 $h^{-1}$ to as high as 300,000 $h^{-1}$. However, it will normally be within the range of about 250–100,000 $h^{-1}$. The actual space velocity used is dependent on the size of the equipment and the ability to remove the exothermic heat generated.

In the following examples, percentages are of a weight unless otherwise indicated.

EXAMPLE 1

A MCM-41 molecular sieve was prepared in accordance with the procedure described in U.S. Pat. No. 5,134,241, incorporated herein by reference. The catalyst had a silica:alumina ratio of more than 5000:1 and average pore diameters of about 63 Å. Nickel was loaded onto the catalyst by the incipient wetness technique and calcined. The catalyst contained 11% by weight of nickel in the form of NiO.

One gram of the catalyst was loaded in a fixed bed reactor operated at atmospheric pressure. Partial oxidation of methane was performed in the presence of air with a methane:oxygen ratio of 2.2:1. Total flow of reactants (including nitrogen as diluent) corresponded to a gas hourly space velocity (GHSV) of 250 $h^{-1}$. Catalyst bed temperatures were varied between 600° C. and 790° C.

Two different batches of catalyst with the same composition were prepared in order to verify the reproducability of the results. Table 1 compares the results for these two tests and it will be noted that total conversion of oxygen was observed during all of these tests. Carbon dioxide and water were the only products observed besides hydrogen and carbon monoxide. The first run lasted 240 hours while the second run lasted nearly 500 hours on stream. The GHSV was increased up to 1500 h$^{-1}$ during the second run. No loss of catalytic activity was observed during either run.

Thermal gravimetric analysis of the spent catalysts has shown that the amount of coke was marginal and independent of the time on stream, indicating that coke accumulation levels are at low enough values to maintain activity for methane conversion.

TABLE 1

| Temperature (° C.) | | CH$_4$ Conversion (%) | | Products Selectivities (%) | | | |
|---|---|---|---|---|---|---|---|
| | | | | CO | | H$_2$ | |
| Test 1 | Test 2 | Test 1 | Test 2 | Test 1 | Test 2 | Test 1 | Test 2 |
| 789 | | 83.9 | | 98.5 | | 98.9 | |
| 770 | 772 | 82.7 | 80.7 | 97.9 | 97.2 | 98.4 | 97.5 |
| 771 | | 82.5 | | 98.2 | | 98.7 | |
| 760 | | 82.1 | | 97.7 | | 98.2 | |
| 750 | 752 | 79.9 | 79.8 | 96.5 | 96.1 | 97.4 | 96.9 |
| 750 | | 81.6 | | 97.2 | | 97.8 | |
| 740 | | 81.1 | | 96.5 | | 97.3 | |
| 730 | 733 | 80.4 | 78.2 | 96.3 | 94.6 | 97.2 | 95.8 |
| 722 | 716 | 79.7 | 76.3 | 95.5 | 93.2 | 96.5 | 94.6 |
| | 716 | | 76.5 | | 94.2 | | 95.3 |
| 705 | 697 | 79.1 | 73.4 | 94.1 | 91.7 | 95.1 | 94.2 |
| | 677 | | 71.4 | | 89.9 | | 90.9 |
| | 657 | | 68.2 | | 83.4 | | 89.2 |
| | 638 | | 64.6 | | 80.3 | | 88.1 |

TABLE 1-continued

| Temperature (° C.) | | CH$_4$ Conversion (%) | | Products Selectivities (%) | | | |
|---|---|---|---|---|---|---|---|
| | | | | CO | | H$_2$ | |
| Test 1 | Test 2 | Test 1 | Test 2 | Test 1 | Test 2 | Test 1 | Test 2 |
| | 618 | | 60.4 | | 75.8 | | 85.8 |
| | 599 | | 55.5 | | 69.5 | | 82.6 |

EXAMPLE 2

A series of tests were conducted using MCM-41 catalyst with various nickel loadings and pore diameters and two comparative tests were also conducted, one with a catalyst comprising a nickel loaded hydrotalcite-like material (U.S. Pat. No. 5,399,537) and a further catalyst comprising a nickel loaded perovskite material.

The feedstock to the process was a mixture of methane and oxygen in a methane:oxygen ratio of 1.98–2.2:1.0. The processing conditions and results obtained are shown in Table 2. From Table 2 it can be seen that the nickel loaded MCM-41 catalyst is superior to both the catalyst based on the hydrotalcite-like material and the perovskite material. In particular, the procedures in accordance with the present invention left no detectable coke on the spent catalyst and there was no decay of activity.

TABLE 2

| Catalyst | MCM-1 | MCM-2 | MCM-3 | MCM-4 | Hydrotalcite | Perovskite |
|---|---|---|---|---|---|---|
| Characteristics | 11.5 wt % NiO 0.37 wt % Al$_2$O$_3$ ~40 Å | 5.33 wt % NiO 0.4 wt % Fe$_2$O$_3$ ~40 Å | 12.4 wt % NiO ~20 Å | ~11 wt % NiO ~40 Å | Ni | ~8 wt % Ni Ca$_{0.8}$Sr$_{0.2}$TiO$_3$ |
| Process unit | Low pressure | Low pressure | Hi P$^d$ Low P$^d$ | Low pressure | Low pressure | Low pressure |
| Temperature (° C.) | 750 | 770/752 | 769  749 | 749 | 760 | 765 |
| CH$_4$ space velocity (mL/hg-cat.) | 4000 | 4094/4044 | 3564  4214 | 4090 | 4000 | 4000 |
| CH$_4$ conversion (%)$^a$ | 83.3/84.5 | (84.1–79.1)/83.7 | 83.1  84.8 | 84.0 | 84.0/83.2 | 85.5/85.3 |
| CO selectivity (%)$^a$ | 90.3/91.0 | (91.6–89.5)/91.2 | 96.6  94.6 | 92.8 | 90.5/87.3 | 93.1/92.5 |
| H$_2$ selectivity (%)$^a$ | 99.2/98.6 | 99.2/99.1 | 97.7  99.2 | 99.2 | 98.8/97.9 | 99.7/99.3 |
| Severity decay (−[dX/dt]/X$_0$) | ~0 | 0.0087/0.0057 | 0.014  ~0 | ~0 | 0.003–0.006 | ~0 |
| Reactor dP/dt (Torr/h)$^a$ | ~0 | ~0 | 12.5  2.1 | ~0 | ~0 | 0.272/0.4 |
| Coke by TGA (g/g-catalyst)$^a$ | ~0 | ~0 | 1.19  0.39 | ~0 | ~0 | 0.38$^b$ (0.33)$^c$/0.26$^c$ |
| Coke by ASTM (g/g-catalyst)$^a$ | ~0 | ~0 | n.a.  n.a. | n.a. | 0.014 | 44.9$^b$/15.8$^c$ |
| Colour of wool support | white | white | black  black | white | black-gray | black-gray |
| Carbon in wool (wt %) | n.a. (~0) | ~0 | n.a.  n.a. | ~0 | 0.84 | 4.98/3.9 |
| Ni in wool (ppm) | n.a. | ~0 | n.a.  n.a. | ~0 | up to 13,300 | n.a. |

$^a$360-h run/120-h run;
$^b$The sample was divided into two portions by magnetism. The magnetic sensitive portion was measured separately. The results were then used for calculations assuming the catalyst was magnetic sensitive.
$^c$A portion of the sample was used for measurement without separation by a magnet.
$^d$Run for 120 h only.

What is claimed is:

1. A process for converting gaseous lower alkanes to synthesis gas, which comprises subjecting a gaseous mixture of said alkanes and oxygen to partial oxidation in a reaction zone in the presence of a catalyst comprising a mesoporous aluminosilicate solid catalyst having the structure of MCM-41 with a silica-to-alumina ratio of about 5:1 to 1000:1 pore diameters of at least 5 Å and a nickel loading of about 5–20% by weight.

2. A process according to claim 1 wherein the atomic ratio of carbon to oxygen in the mixture alkane and oxygen gas is in the range of about 0.75:1.0 to 1.1:1.0.

3. A process according to claim 2 wherein the gaseous mixture is reacted at a temperature of about 400–1000 C.

4. A process according to claim 3 wherein the nickel loading is in the range of about 11–15% by weight.

5. A process according to claim 3 wherein the oxygen comprises air.

6. A process according to claim 3 wherein the lower alkanes comprises $C_1$–$C_4$ alkanes.

7. A process according to claim 6 wherein the lower alkanes comprise natural gas containing methane.

8. A process according to claim 7 wherein the MCM-41 catalyst has average pore diameters in the range of about 15–100 Å.

9. A process according to claim 8 wherein the space velocity is in the range of about 250 $h^{-1}$ to about 100,000$h^{-1}$.

10. A process according to claim 1 wherein the nickel is in the form of NiO.

* * * * *